G. SANFORD.
Disintegrating Fibrous Plants.
No. 31,479.
Patented Feb. 19, 1861.
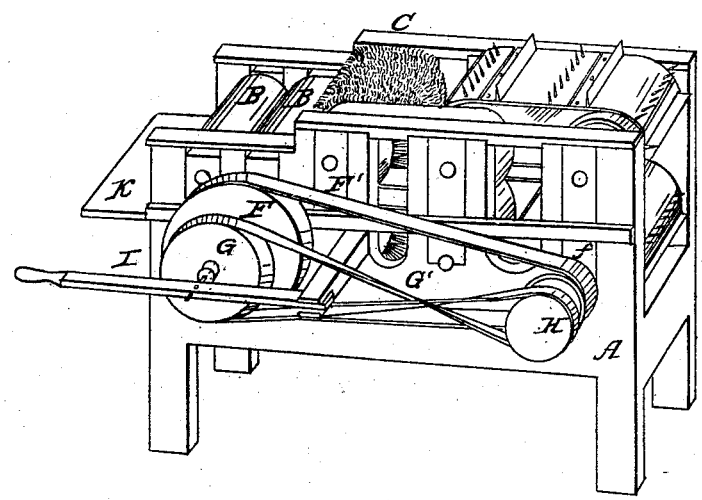
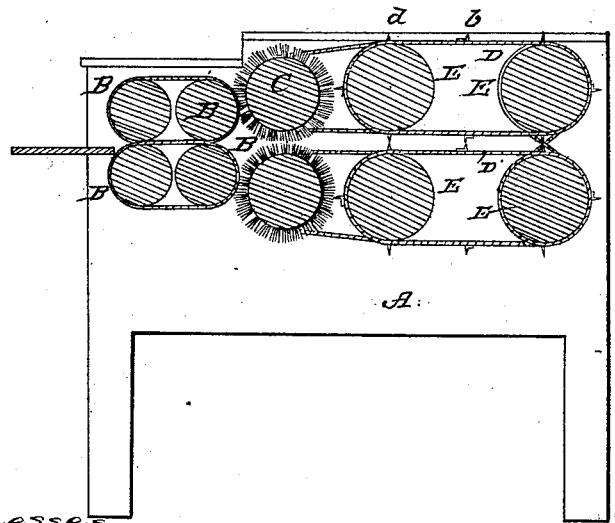

UNITED STATES PATENT OFFICE.

GELSTON SANFORD, OF NEW YORK, N. Y.

IMPROVEMENT IN MACHINES FOR TREATING VEGETABLE FIBER.

Specification forming part of Letters Patent No. 31,479, dated February 19, 1861.

*To all whom it may concern:*

Be it known that I, GELSTON SANFORD, of New York city, county, and State, have invented a new and useful Machine for Separating Extraneous Matter from Vegetable Fiber Used for Rope, Paper, &c.; and I do hereby declare that the following is a full and exact description thereof, reference being had to the accompanying drawings, and to the letters of reference marked thereon.

In the drawings, Figure 1 is a perspective view. Fig. 2 is a longitudinal vertical section. Fig. 3 shows rollers E'.

To enable those skilled in the art to make and use my invention, I will describe its construction and operation.

In the drawings, A is the general framework of the machine.

B are the two pair of feed-rollers. These rollers are made either plain or fluted, as may be preferred.

C are the brushes, which serve to brush away the extraneous matter, scour, and separate finely the fibers of the material being cleaned.

D are the elastic belts passing over rollers E. These belts I prefer to be elastic, but they need not be elastic; or I may make the outer surface only of the belts elastic.

$a$ are small pointed teeth inserted in the belts D from the under side.

$b$ are pieces of sheet metal, attached also to the belts, and serve as scrapers for removing the extraneous material after the teeth $a$ have combed the substance to be cleansed.

F is the pulley for driving the rollers B when they feed forward; G, the pulley for driving said rollers when they feed backward. H is the driving-pulley shaft. (The driving-pulley is in the rear, and not shown in the drawings.)

$f$ and $g$ are the pulleys having belts F' and G' passing over the pulleys F and G.

I is a lever with clutch for throwing pulleys F and G in or out of gear.

K is the feed-board.

In operating my invention, a stream of water is kept flowing upon the belts D, or they may be kept altogether under water when the vegetable substance to be treated is green or not dried. The use of water is dispensed with when dry vegetable matter is treated. The material to be treated is fed from the feed-board K between the feed-rollers B, which, being driven by pulley F, belt F', and pulley $f$ of driving-shaft, feed the flax, &c., forward between the brushes C and endless belts D. These brushes and belts move at a greater speed than the rollers B, and comb, scrape, and scour the material, removing the waste and useless matter. When half the length of the fiber is cleansed, the lever I throws the pulley F out and the pulley G in gear, thus reversing the action of the feed-rollers and the brushes C and belts D, running the fiber backward out of the machine. This being done, the other end or half of the fiber is in like manner treated. By this means the fiber is kept straight, and the extraneous matter discharged at the opposite end. The brushes C also serve to clean teeth $a$ and scrapers $b$ and keep them in order.

The belts D and rollers E may be removed, and rollers E' similar to those, but covered with a section of belt having teeth and scrapers similar to those on belts D, be substituted in their place. (See Fig. 3.)

What I claim as new, and desire to secure by Letters Patent, is—

The arrangement of the feed-rollers B B, the brushes, the belts D D, armed alternately with teeth and scrapers, as shown, and the carrying-rollers E, the whole being also arranged to operate in reverse directions at will, as above set forth.

GELSTON SANFORD.

Witnesses:
 H. JOHNSON,
 JOS. C. CLAYBOR.